United States Patent
Dionisio et al.

(10) Patent No.: US 10,204,065 B2
(45) Date of Patent: Feb. 12, 2019

(54) METHODS AND APPARATUS FOR A MULTIPLE MASTER BUS PROTOCOL

(71) Applicant: ASCENSIA DIABETES CARE HOLDINGS AG, Basel (CH)

(72) Inventors: Christopher Dionisio, Millington, NJ (US); Todd T. Swanzey, Putnam Valley, NY (US); Gregory R. Stefkovic, Mahopac, NY (US)

(73) Assignee: Ascensia Diabetes Care Holdings AG, Basel (CH)

( * ) Notice: Subject to any disclaimer, the term of this patent is extended or adjusted under 35 U.S.C. 154(b) by 8 days.

(21) Appl. No.: 15/117,181

(22) PCT Filed: Feb. 6, 2015

(86) PCT No.: PCT/US2015/014925
§ 371 (c)(1),
(2) Date: Aug. 5, 2016

(87) PCT Pub. No.: WO2015/120339
PCT Pub. Date: Aug. 13, 2015

(65) Prior Publication Data
US 2016/0350248 A1     Dec. 1, 2016

Related U.S. Application Data

(60) Provisional application No. 61/937,446, filed on Feb. 7, 2014.

(51) Int. Cl.
*G06F 13/364*     (2006.01)
*G06F 13/376*     (2006.01)
(Continued)

(52) U.S. Cl.
CPC .......... *G06F 13/364* (2013.01); *G06F 13/376* (2013.01); *G06F 13/404* (2013.01); *G06F 13/4282* (2013.01); *G06F 2213/0016* (2013.01)

(58) Field of Classification Search
None
See application file for complete search history.

(56) References Cited

U.S. PATENT DOCUMENTS 5,555,425 A * 9/1996 Zeller .................. G06F 13/364
                                           710/110
6,233,635 B1 * 5/2001 Son ...................... G06F 13/4291
                                           710/315
(Continued)

FOREIGN PATENT DOCUMENTS

CN     102193889 A     9/2011
CN     102025565 B     12/2012
(Continued)

OTHER PUBLICATIONS

International Search Report and Written Opinion in counterpart International Application No. PCT/US2015/014925 dated Apr. 23, 2015.
(Continued)

*Primary Examiner* — Elias Mamo
(74) *Attorney, Agent, or Firm* — Dugan & Dugan, PC

(57) ABSTRACT

Embodiments of the invention provide systems, methods, and apparatus for arbitrating a multi-master computer bus. The embodiments include a multi-master serial computer bus; a first master coupled to the bus; a second master coupled to the bus; a slave device coupled to the bus; a first I/O line from the first master going to the second master and the slave device; and a second I/O line from the second master going to the first master and the slave device. A bus arbitration protocol for arbitrating use of the bus restricts the masters to a single transaction each time either master becomes a bus master, and the masters are each adapted to use the I/O lines to signal to each other not to become a bus master. Numerous other aspects are disclosed.

20 Claims, 6 Drawing Sheets

(51) Int. Cl.
*G06F 13/42* (2006.01)
*G06F 13/40* (2006.01)

(56) References Cited

U.S. PATENT DOCUMENTS

| | | | |
|---|---|---|---|
| 7,000,049 B1* | 2/2006 | Heitkamp | G06F 13/376 |
| | | | 710/110 |
| 7,546,446 B2* | 6/2009 | Henry | G06F 9/3004 |
| | | | 710/262 |
| 2004/0003317 A1 | 1/2004 | Kwatra et al. | |
| 2005/0289268 A1* | 12/2005 | Miller | G06F 13/4054 |
| | | | 710/110 |
| 2007/0016708 A1* | 1/2007 | Park | G06F 13/4022 |
| | | | 710/110 |
| 2011/0029633 A1* | 2/2011 | Chen | H04L 67/125 |
| | | | 709/209 |
| 2013/0042248 A1* | 2/2013 | Gargash | G06F 9/526 |
| | | | 718/102 |
| 2014/0173162 A1* | 6/2014 | Danis | G06F 13/32 |
| | | | 710/310 |
| 2014/0268455 A1 | 9/2014 | Gofman | |
| 2014/0281080 A1* | 9/2014 | Eddleman | G06F 13/4291 |
| | | | 710/110 |

FOREIGN PATENT DOCUMENTS

| | | |
|---|---|---|
| TW | 201110784 | 3/2011 |
| WO | WO 2000/002134 A2 | 1/2000 |

OTHER PUBLICATIONS

International Preliminary Report on Patentability in counterpart International Application No. PCT/US2015/014925 dated Aug. 18, 2016.
Taiwan Search Report in counterpart Taiwan Application No. 104104106 dated Jul. 17, 2018.

* cited by examiner

US 10,204,065 B2

METHODS AND APPARATUS FOR A MULTIPLE MASTER BUS PROTOCOL

RELATED APPLICATIONS

The present application claims priority to co-pending U.S. Provisional Patent Application No. 61/937,446 filed Feb. 7, 2014 and entitled "METHODS AND APPARATUS FOR A MULTIPLE MASTER BUS PROTOCOL" which is hereby incorporated herein by reference in its entirety for all purposes.

FIELD

The present invention relates to bus protocols, and more specifically to apparatus, systems, and methods for a multiple master bus protocol.

BACKGROUND

The Inter-Integrated Circuit standard (referred to as I²C, I2C, i2c, I-squared-C, I-two-C, or IIC) defines a multi-master serial single-ended computer bus invented by the Philips semiconductor division, today NXP Semiconductors, and generally used for attaching low-speed peripherals to a motherboard, embedded system, cellphone, or other digital electronic devices. The summary description of I²C included herein provides basic information about the I²C system and additional detailed information can be found in the "I²C-bus Specification and User Manual" (Rev. 5, 9 Oct. 2012) available at http://www.nxp.com/documents/user_manual/UM10204.pdf published by NXP Semiconductors and hereby incorporated herein by reference in its entirety for all purposes.

As will be discussed in more detail below, I²C limits the amount of control a bus master can assert over the I²C bus and thus limits what transactions can be reliably performed using an I²C bus. I²C also has other limitations that may make it unsuitable for some applications. Accordingly, systems, apparatus, and methods for providing improved multi-master support within the I²C protocol are needed.

SUMMARY

In some aspects, embodiments of the present invention provide an apparatus for arbitrating a multi-master computer bus. The apparatus including a multi-master serial computer bus; a first master coupled to the bus; a second master coupled to the bus; a slave device coupled to the bus; a first I/O line from the first master going to the second master and the slave device; and a second I/O line from the second master going to the first master and the slave device. A bus arbitration protocol for arbitrating use of the bus restricts the masters to a single transaction each time either master becomes a bus master, and the masters are each adapted to use the I/O lines to signal to each other not to become a bus master.

In other aspects, embodiments of the present invention provide a system for arbitrating a multi-master computer bus. The system including a multi-master serial computer bus; a plurality of masters coupled to the bus; a plurality of slave devices coupled to the bus; a plurality of I/O lines wherein an I/O line extends from each of the plurality of masters going to all others of the plurality of masters and each of the slave devices. A bus arbitration protocol for arbitrating use of the bus restricts the masters to a single transaction each time any master becomes a bus master, and the masters are each adapted to use the I/O lines to signal to one another not to become a bus master.

In yet other aspects, embodiments of the present invention provide a method for arbitrating a multi-master computer bus. The method includes providing a multi-master serial computer bus coupling a first master, a second master and a slave device; providing a first I/O line from the first master extending to the second master and the slave device; providing a second I/O line from the second master extending to the first master and the slave device; restricting each of the masters to a single transaction with the slave device when either master becomes a bus master; signaling the second master to not become a bus master using the first I/O line when the first master intends to perform a sequence of consecutive, uninterrupted transactions with the slave device without the second master intervening; and signaling the first master to not become a bus master using the second I/O line when the second master intends to perform a sequence of consecutive, uninterrupted transactions with the slave device without the first master intervening.

Numerous other aspects are provided in accordance with these and other embodiments of the invention. Other features and aspects of embodiments of the present invention will become more fully apparent from the following detailed description, the appended claims, and the accompanying drawings.

DETAILED DESCRIPTION

Figure 1:
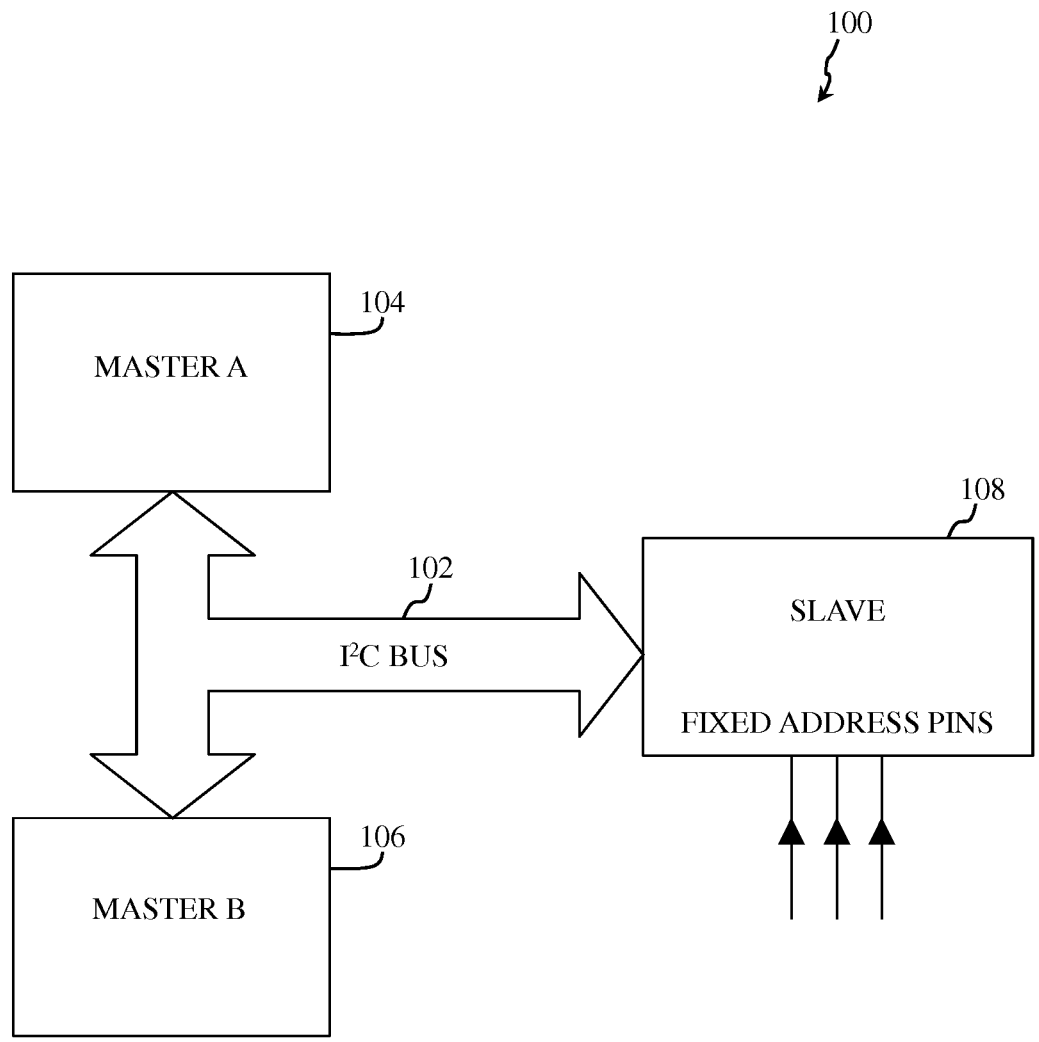
FIG. 1 illustrates a block diagram of an example I²C system implemented according to the prior art.

Embodiments of the present invention provide an improved I²C multi-master bus exclusion method and apparatus that enables performing multiple, uninterrupted transactions with a slave device on the I²C bus without any intervening transactions by other masters with the slave device. The standard I²C specification provides an arbitration method for one of multiple masters to obtain control of the I²C bus prior to a single transaction with a slave device but does not provide any means to allow the master to maintain exclusive control in order to, for example, complete an uninterrupted sequence of multiple transactions such as read-modify-write transactions. The present invention enables a master (e.g., a microcontroller) to retain exclusive access to a slave device (e.g., a memory) for multiple consecutive transactions without competition for access to the slave by other masters. Note that the term "single transaction" as used herein means a single read command, a single write command, or a single combined format command (which is limited to two reads, two writes, or one read and one write) between a START marker and a STOP marker.

Conventional I²C uses only two bidirectional open-drain lines, a Serial Data Line (SDA) and a Serial Clock (SCL), pulled up with resistors. Typical voltages used are +5 V or +3.3 V although systems with other voltages are permitted.

The I²C reference design has a 7-bit or a 10-bit (depending on the device used) address space. Common I²C bus speeds are the 100 kbit/s standard mode and the 10 kbit/s low-speed mode, but arbitrarily low clock frequencies are also allowed. Recent revisions of I²C can host more nodes and run at faster speeds (e.g., 400 kbit/s Fast mode, 1 Mbit/s Fast mode plus or Fm+, and 3.4 Mbit/s High Speed mode). These speeds are more widely used on embedded systems than on PCs. There are also other features available, such as 16-bit addressing.

Note the bit rates are quoted for the transactions between master and slave without clock stretching or other hardware overhead. Protocol overheads include a slave address and perhaps a register address within the slave device as well as per-byte ACK/NACK bits. Thus the actual transfer rate of user data is lower than those peak bit rates alone would imply. For example, if each interaction with a slave inefficiently allows only 1 byte of data to be transferred, the data rate will be less than half the peak bit rate.

The maximum number of nodes is limited by the address space, and also by the total bus capacitance of 400 pF, which restricts practical communication distances to a few meters.

The reference design is a bus with a clock (SCL) and data (SDA) lines with 7-bit addressing. The bus has two roles for nodes: master and slave. A master node is node that generates the clock and initiates communication with slaves. A slave node is a node that receives the clock and responds when addressed by the master.

The bus is a multi-master bus which means any number of master nodes can be present. Additionally, master and slave roles may be changed between messages (e.g., after a STOP is sent). There are four potential modes of operation for a given bus device, although most devices only use a single role and its two modes. The modes include master transmit, master receive, slave transmit, and slave receive. In the master transmit mode, a master node is sending data to a slave. In the master receive mode, a master node is receiving data from a slave. In the slave transmit mode, a slave node is sending data to a master and in a slave receive mode, a slave node is receiving data from a master.

The master is initially in master transmit mode by sending a start bit followed by the 7-bit address of the slave it wishes to communicate with, which is finally followed by a single bit representing whether it wishes to write(0) to or read(1) from the slave.

If the slave exists on the bus then it will respond with an ACK bit (active low for acknowledged) for that address. The master then continues in either transmit or receive mode (according to the read/write bit it sent), and the slave continues in its complementary mode (receive or transmit, respectively).

The address and the data bytes are sent most significant bit first. The start bit is indicated by a high-to-low transition of SDA with SCL high; the stop bit is indicated by a low-to-high transition of SDA with SCL high. All other transitions of SDA take place with SCL low.

If the master wishes to write to the slave then it repeatedly sends a byte with the slave sending an ACK bit. (In this situation, the master is in master transmit mode and the slave is in slave receive mode.)

If the master wishes to read from the slave then it repeatedly receives a byte from the slave, the master sending an ACK bit after every byte but the last one. (In this situation, the master is in master receive mode and the slave is in slave transmit mode.)

The master then either ends transmission with a stop bit, or it may send another START bit if it wishes to retain control of the bus for another transfer (a "combined message").

I²C defines basic types of messages, each of which begins with a START marker and ends with a STOP marker. These message types include a single message where a master writes data to a slave; a single message where a master reads data from a slave; and combined messages, where a master issues at most two reads and/or writes to one or more slaves.

In a combined message, each read or write begins with a START marker and the slave address. After the first START marker in a combined message these are also called repeated START bits. Repeated START bits are not preceded by STOP bits, which is how slaves know the next transfer is part of the same message. Conventionally, combined messages are limited to two reads, two writes, or one read and one write (in either order) between a START and a STOP marker. Thus, during a single transaction using the combined format, up to two commands can be sent between a START and a STOP marker.

Any given slave will only respond to particular messages, as defined by its product documentation. I²C systems support arbitrary message structures. With only a few exceptions, the I²C specification does not define message semantics, such as the meaning of data bytes in messages. Message semantics are otherwise product-specific. Those exceptions include messages addressed to the I²C general call address (0x00).

In practice, most slaves adopt request/response control models, where one or more bytes following a write command are treated as a command or address. Those bytes determine how subsequent written bytes are treated and/or how the slave responds on subsequent reads. Most I²C operations involve single byte commands.

At the physical layer, both SCL and SDA lines are of open-drain design, thus, pull-up resistors are needed. Pulling the line to ground is considered a logical zero while letting the line float is a logical one. This is used as a channel access method. High speed systems (and some others) also add a current source pull up, at least on SCL; this accommodates higher bus capacitance and enables faster rise times.

An important consequence of this is that multiple nodes may be driving the lines simultaneously. If any node is driving the line low, it will be low. Nodes that are trying to transmit a logical one (i.e. letting the line float high) can see this, and thereby know that another node is active at the same time.

When used on SCL, this is called clock stretching and gives slaves a flow control mechanism. When used on SDA, this is called arbitration and ensures there is only one transmitter at a time.

When idle, both lines are high. To start a transaction, SDA is pulled low while SCL remains high. Releasing SDA to float high again would be a stop marker, signaling the end of a bus transaction. Although legal, this is typically pointless immediately after a start, so the next step is to pull SCL low.

Except for the start and stop signals, the SDA line only changes while the clock is low; transmitting a data bit consists of pulsing the clock line high while holding the data line steady at the desired level.

While SCL is low, the transmitter (initially the master) sets SDA to the desired value and (after a small delay to let the value propagate) lets SCL float high. The master then waits for SCL to actually go high; this will be delayed by the finite rise-time of the SCL signal (the RC time constant of the pull-up resistor and the parasitic capacitance of the bus), and may be additionally delayed by a slave's clock stretching.

Once SCL is high, the master waits a minimum time (e.g., 4 μs for standard speed I²C) to ensure the receiver has seen the bit, then pulls it low again. This completes transmission of one bit.

After every 8 data bits in one direction, an "acknowledge" bit is transmitted in the other direction. The transmitter and receiver switch roles for one bit and the erstwhile receiver transmits a single 0 bit (ACK) back. If the transmitter sees a 1 bit (NACK) instead, it learns that the slave is unable to accept the data because, for example, no such slave exists, the command was not understood, or the receiver is unable to accept any more data when a master is transmitting to a slave. If a slave is transmitting to a master and a NACK is received back by the slave, this indicates the master wishes the transfer to stop after the current data byte.

After the acknowledge bit, the master may do one of three things: (1) prepare to transfer another byte of data: the transmitter sets SDA, and the master pulses SCL high; (2) send a "Stop": sets SDA low, lets SCL go high, then let SDA go high, this releases the I²C bus; or (3) send a "Repeated start": sets SDA high, lets SCL go high, and pulls SDA low again. This starts a new I²C bus transaction without releasing the bus.

One of the more significant features of the I²C protocol is clock stretching. An addressed slave device may hold the clock line (SCL) low after receiving (or sending) a byte, indicating that it is not yet ready to process more data. The master that is communicating with the slave may not finish the transmission of the current bit, but must wait until the clock line actually goes high. If the slave is clock stretching, the clock line will still be low (because the connections are open-drain). The same is true if a second, slower, master tries to drive the clock at the same time. (If there is more than one master, all but one of them will normally lose arbitration.)

The master must wait until it observes the clock line going high, and an additional minimum time (e.g., 4 μs for standard 100 kbit/s I²C) before pulling the clock low again.

Although the master may also hold the SCL line low for as long as it desires, the term "clock stretching" is normally used only when slaves do it. Although in theory any clock pulse may be stretched, generally it is the intervals before or after the acknowledgment bit which are used. For example, if the slave is a microcontroller, its I²C interface could stretch the clock after each byte, until the software decides whether to send a positive acknowledgment or a NACK.

Clock stretching is the only time in I²C where the slave drives SCL. Many slaves do not need to clock stretch and thus treat SCL as strictly an input with no circuitry to drive it. Some masters, such as those found inside custom ASICs may not support clock stretching; often these devices will be labeled as a "two-wire interface" and not I²C.

Every master monitors the bus for start and stop bits, and in general does not start a message while another master is keeping the bus busy during a single transaction. However, two masters may start transmission at about the same time; in this case, arbitration occurs. Slave transmit mode can also be arbitrated, when a master addresses multiple slaves, but this is less common. In contrast to protocols (such as Ethernet) that use random back-off delays before issuing a retry, I²C has a deterministic arbitration policy. Each transmitter checks the level of the data line (SDA) and compares it with the levels it expects; if they do not match, that transmitter has lost arbitration, and drops out of this protocol interaction.

If one transmitter sets SDA to 1 (not driving a signal) and a second transmitter sets it to 0 (pull to ground), the result is that the line is low. The first transmitter then observes that the level of the line is different than expected, and concludes that another node is transmitting. The first node to notice such a difference is the one that loses arbitration: it stops driving SDA. If it's a master, it also stops driving SCL and waits for a STOP; then it may try to reissue its entire message. In the meantime, the other node has not noticed any difference between the expected and actual levels on SDA, and therefore continues transmission. It can do so without problems because so far the signal has been exactly as it expected; no other transmitter has disturbed its message.

If the two masters are sending a message to two different slaves, the one sending the lower slave address always "wins" arbitration in the address stage. Since the two masters may send messages to the same slave address—and addresses sometimes refer to multiple slaves—arbitration must continue into the data stages.

Arbitration occurs very rarely, but is necessary for proper multi-master support. As with clock-stretching, not all devices support arbitration. Those that do generally label themselves as supporting "multi-master" communication.

In the extremely rare case that two masters simultaneously send identical messages concurrently, both will regard the communication as successful, but the slave will only see one message. Slaves that can be accessed by multiple masters must have commands that are idempotent for this reason. I²C also has other limitations that may make it unsuitable for some applications.

FIG. 1 depicts a block diagram of a standard multi-master I²C system 100 of the prior art that includes a standard I²C bus 102. The standard I²C bus 102 allows communication between multiple masters 104, 106 (only two are shown in this example) and one or more slave devices 108 (only one shown in this example). The slave device 108 includes a fixed number of address pins (e.g., three are shown in this example).

Figure 2:
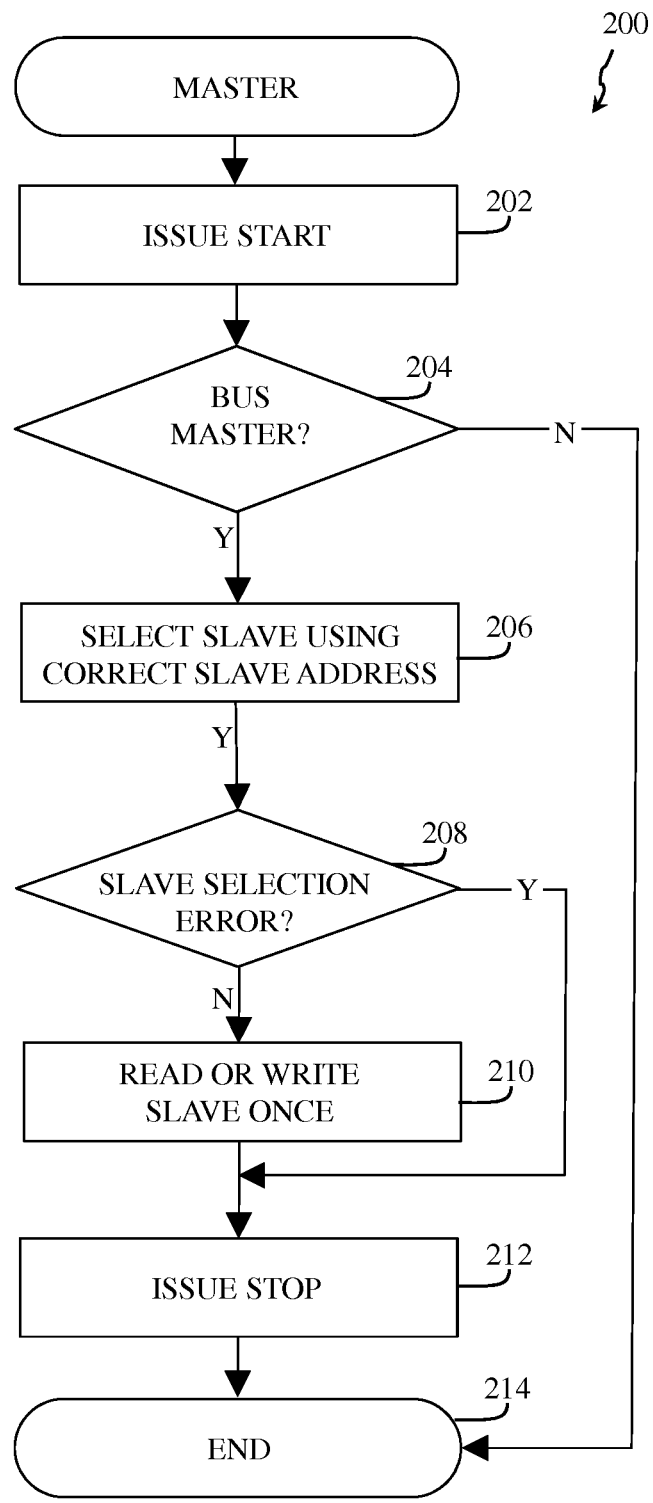
FIG. 2 illustrates a flowchart depicting operation of the example I²C system of FIG. 1.

FIG. 2 is a flowchart that illustrates the standard I²C bus arbitration process 200 used in the standard multi-master I²C system 100 of FIG. 1. When either master 104, 106 wants to access a slave device 108, the master (e.g., Master A 104 or Master B 106) issues a START command (202) and then determines if the master is the current bus master (204). If so, the master selects the desired slave device 108 using the address of the slave device 108 (206). If not, the process 200 ends (214). If the master does select a slave device 108, a check is next performed to determine of the slave has been correctly selected (208) and if there is no error, a single transaction (e.g., read, write, or combined) with the selected slave is performed (210). However, if a slave selection error does occur the transaction is not performed. In either case, a STOP command is issued (212) and the process 200 ends (214).

With each of the masters 104,106 concurrently executing this standard I²C bus arbitration process 200, one of the masters 104,106 obtains control of the I²C bus prior to a single transaction with the selected slave device. However, a significant limitation of this arbitration process 200 of the prior art is that the master can only perform a single transaction with the selected slave device 108 once the master becomes the bus master and then, upon the master completing the single transaction, another master can potentially become bus master and, for example, write to the slave device. The problem is that if the slave device 108 is a memory device for example, and an uninterrupted read-modify-write sequence of transactions are required to insure data consistency for example, the standard I²C bus arbitration process 200 cannot guarantee that a second master will not gain control of the I²C bus 102, interrupt the original master, and modify the memory before the original master completes all parts of the read-modify-write sequence of transactions. Thus, the standard I²C bus arbitration process 200 can result in data inconsistency problems since the system 100 does not provide for uninterruptable multi-transaction sequences.

To better illustrate this problem, consider the following two example slave access sequences. In the first example sequence, Master A 104 initially reads data from the Slave equal to 0x01, then Master A 104 writes data to the Slave equal to 0x02, and finally Master B 106 reads data from the Slave equal to 0x02. This first sequence results in a desired outcome. Both masters 104, 106 find that the slave provides consistent data.

However, in a second example sequence, Master A 104 initially reads data from the Slave equal to 0x01, then Master B 106 reads data from the Slave equal to 0x01, and finally Master A 104 writes data to the Slave equal to 0x02. The second example sequence results in a problematic outcome. The two masters 104, 106 experience that the slave has two different values and thus, inconsistent data.

Embodiments of the present invention address this potential data inconsistency problem by improving upon the standard I²C bus arbitration process 200 by adding a capability to the system 100 that enables an I²C bus master to perform multiple, consecutive I²C transactions while preventing all other I²C masters from performing any intervening I²C transactions. By adding one additional general purpose input/output (I/O) pin for each master and some software logic, the present invention provides the ability for masters to perform multiple transactions (e.g., a read-modify-write transaction sequence) without being interrupted by other intervening masters.

Figure 3:
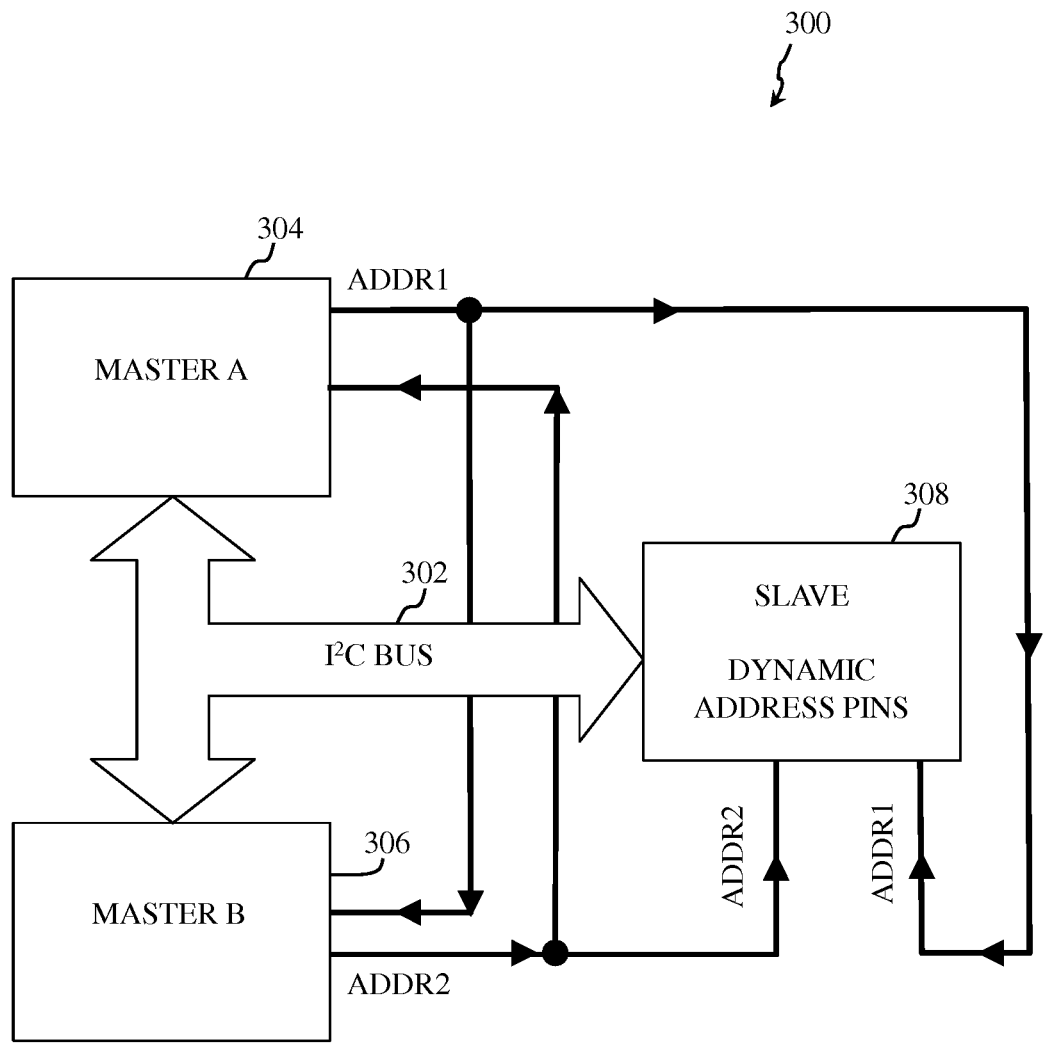
FIG. 3 illustrates a block diagram of an example of an improved I²C system according to some embodiments of the present invention.

FIG. 3 depicts an example embodiment of an improved multi-master I²C system 300 that provides this mutual exclusion of access to the slave capability. As with the standard system 100 of the prior art, the improved multi-master I²C system 300 of embodiments of the present invention includes an I²C bus 302 that allows communication between multiple masters 304, 306 (only two are shown in this example for simplicity) and one or more slave devices 308 (only one shown in this example for simplicity). It will be understood that additional masters and slaves can be included in the system 300 but that the simple example depicted in FIG. 3 is used to more clearly illustrate the features of the present invention. In addition to the elements of a standard I²C system 100, the improved multi-master I²C system 300 of embodiments of the present invention also includes I/O lines ADDR1 and ADDR2 coming from each master 304, 306 in the system 300 that are each coupled to each of the other masters and dynamic address pins (e.g., Address1, Address2) of the slave devices 308. This arrangement provides each master 304, 306 with the ability to uniquely address the slave device 308 prior to access. In a system with additional masters, an additional I/O line per additional master would be added.

This ability to have a unique address to access the slave device 308 for each master 304, 306 can be implemented by imposing the following rule set: The I/O lines ADDR1, ADDR2 are normally held at logic 1 via hardware in an idle state when none of the masters 304,306 are accessing the slave device 308; ADDR1 can only be driven to logic 0 by a software instruction executing on Master A 304; Address1 (on the I²C bus 302) can only be used by a software instruction executing on Master A 304; ADDR2 can only be driven to logic 0 by a software instruction executing on Master B 306; and Address2 (on the I²C bus 302) can only be used by a software instruction executing on Master B 306. The following table summarizes this rule set.

| Which master can access the slave? | ADDR1 | ADDR2 | Slave Address |
|---|---|---|---|
| Neither | 0 | 0 | Address0 |
| Master A | 0 | 1 | Address1 |
| Master B | 1 | 0 | Address2 |
| Neither | 1 | 1 | Address3 |

Note that in the rare case that the masters 304, 306 are both driving their I/O lines ADDR1, ADDR2 low to logic 0, the slave address will be Address0 and will only respond to Address0, so neither master 304,306 can access the slave device 308 because they will be using a non-matching address (Address1 or Address2) on the I²C bus 302. This capability also allows a master without conventional I2C multi-master support to be used with embodiments of the present invention. Note also that instead of holding the I/O lines high at logic 1 during idle state and pulling an I/O low to logic 0 to indicate that a master is accessing a slave, the system 300 could alternatively be implemented such that logic 0 is the idle state value of the I/O lines and logic 1 is used to indicate that a master is accessing a slave.

The following pseudo code examples illustrate the protocol each master 304,306 will follow to access the slave device 308. When Master A 304 wants to access the slave device 308, Master A 304 behaves as follows:
If ADDR2=1, then: /*Master B is not talking to slave*/
1. Drive ADDR1=0/*Master A wants exclusive access*/
2. Issue a START condition
3. If Master A becomes the I²C bus master, then:
   Select the Slave by using Address1 over I²C
   Access the Slave over I²C
   Issue a STOP condition
   for more transactions go to Step 2)
4. Drive ADDR1=1/*Master A is finished*/

When Master B 306 wants to access the slave device 308, Master B 306 behaves as follows:
If ADDR1=1, then: /*Master A is not talking to slave*/
1. Drive ADDR2=0/*Master B wants exclusive access*/
2. Issue a START condition
3. If Master B becomes the I²C bus master, then:
   Select the Slave by using Address2 over I²C
   Access the Slave over I²C
   Issue a STOP condition
   for more transactions go to Step 2)
4. Drive ADDR2=1/*Master B is finished*/

Figure 4:
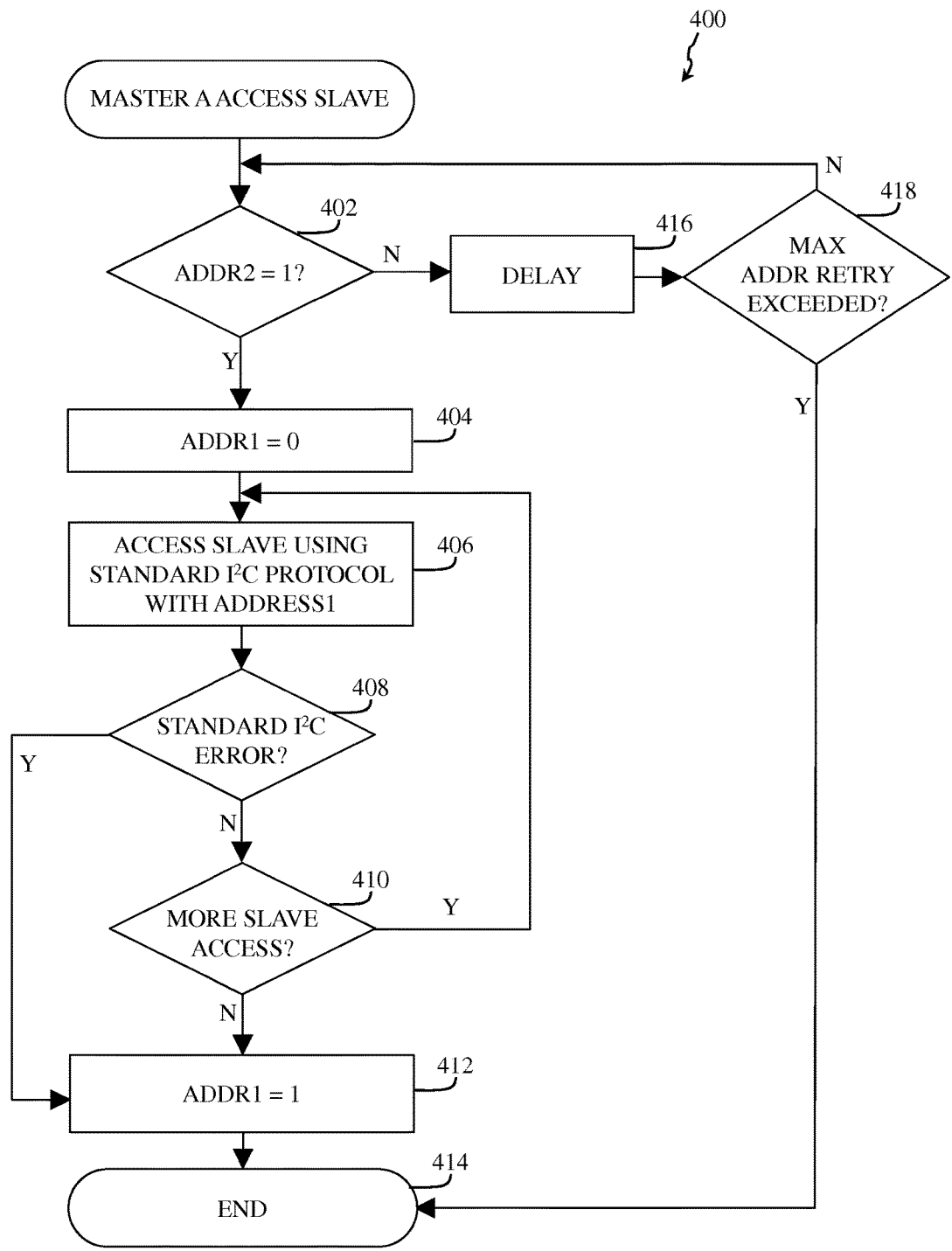
FIGS. 4 to 6 illustrate flowcharts depicting operation of the example improved I²C system of FIG. 3.
Figure 5:
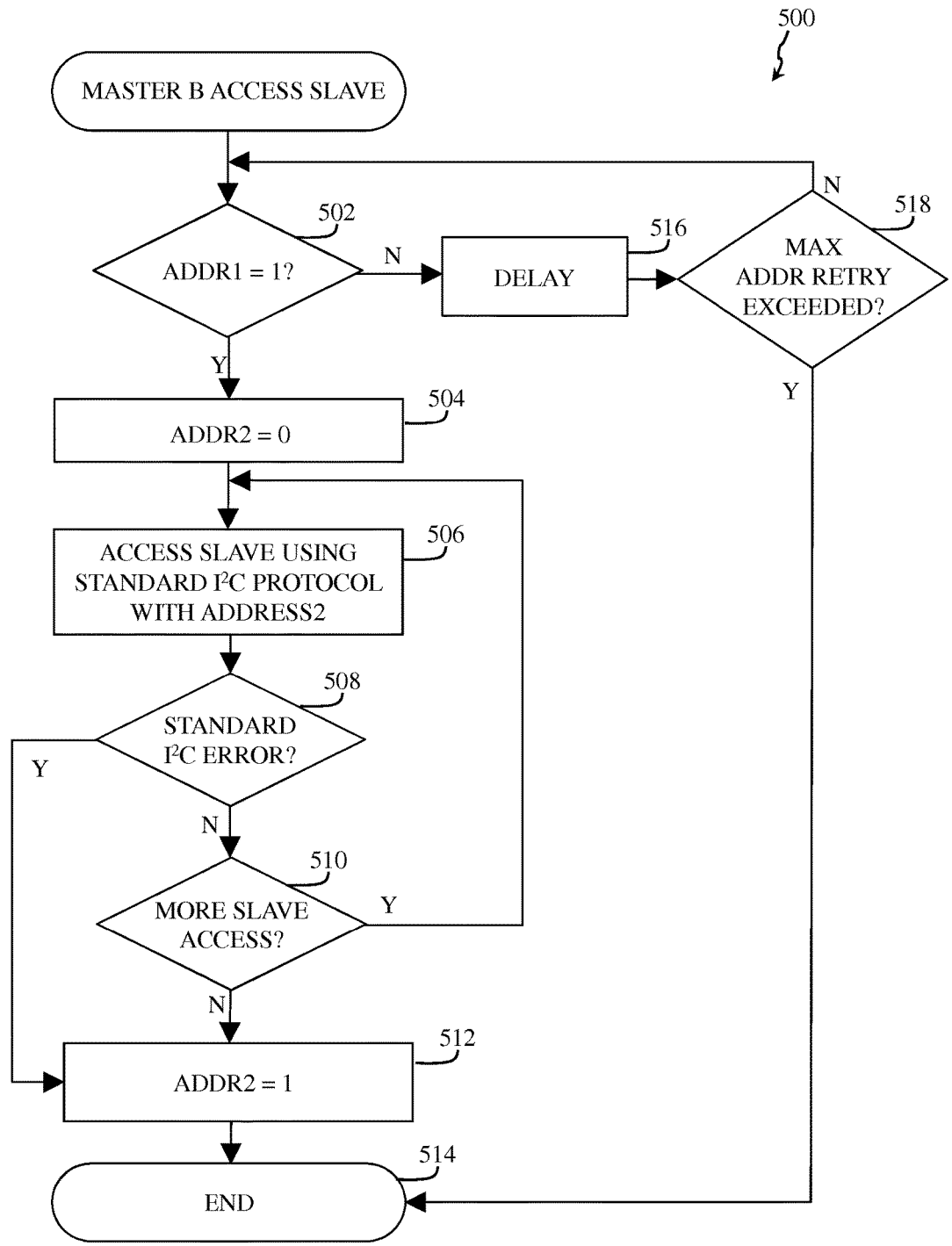
Figure 6:
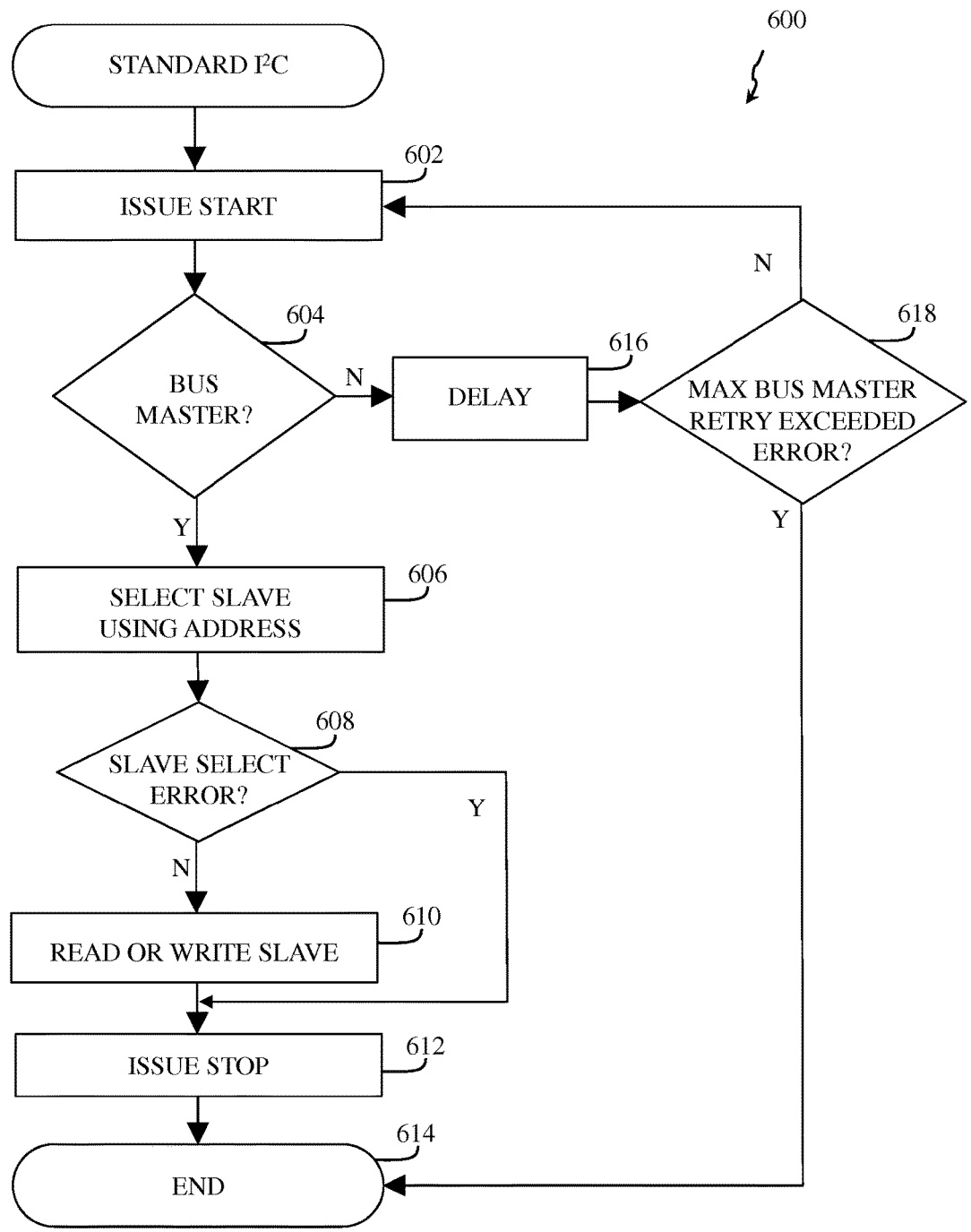

These example methods of the present invention embodied in the above pseudo code segments are further illustrated in the flowcharts of FIGS. 4 to 6. Note that the number of retries and the length of the delays are determined based on the specifics of a particular hardware implementation of the system 300. In some embodiments, the delays can be set to lengths that are not harmonic intervals to avoid unnecessary extra retries/timeouts and potential race conditions.

FIG. 4 depicts a flowchart that illustrates the example method 400 that Master A 304 would use to access the slave device 308 of the improved I²C system 300 of embodiments of the present invention. Master A 304 first determines if the other master, Master B 306, is currently accessing the slave device 308 by checking if ADDR2 is at logic 1 (402). If the system included other masters, Master A 304 would also check the I/O lines of the other masters. If ADDR2 is at logic 1, meaning that Master B 306 is not accessing the slave device 308, then Master A 304 pulls ADDR1 to logic 0 (404). This indicates to Master B 306 that Master A is accessing the slave device 308. Master A then accesses the slave device 308 via Address1 using a modified version of the standard I²C protocol (406) as illustrated in FIG. 6 and described below. Master A 304 then checks for errors (408) and then whether there are more slave accesses to be made (410). If there are no more transactions with the slave device 308, Master A 304 returns ADDR1 to logic 1 (412) and the method ends (414).

If there is an error after accessing the slave device 308, Master A 304 discontinues accessing the slave device 308, returns ADDR1 to logic 1 (412) and the method ends (414). If there are additional slave accesses to be performed after the initial access (406) and error check (408), then Master A 304 again accesses the slave device 308 via Address1 using the standard I²C protocol (406) and flow continues from there.

If Master B 306 is accessing the slave device 308 (as indicated by ADDR2 being at logic 0) when Master A 304 checks ADDR2 (402), then Master A 304 backs off for a delay period (416) and then checks if a maximum retry limit has been exceeded (418). If the maximum retry limit has not been exceeded, Master A 304 checks ADDR2 again (402) and flow continues from there. If the maximum retry limit has been exceeded, the method ends (414).

Analogously, FIG. 5 depicts a flowchart that illustrates the example method 500 that Master B 306 would use to access the slave device 308 of the improved I²C system 300 of embodiments of the present invention. Master B 306 first determines if the other master, Master A 304, is currently accessing the slave device 308 by checking if I/O line ADDR1 is at logic 1 (502). If the system included other masters, Master B 306 would also check the I/O lines of the other masters. If I/O line ADDR1 is at logic 1, meaning that Master A 304 is not accessing the slave device 308, then Master B 306 pulls ADDR2 to logic 0 (504). This indicates to Master A 304 that Master B 306 is accessing the slave device 308. Master B 306 then accesses the slave device 308 via Address2 using a modified version of the standard I²C protocol (506) as illustrated in FIG. 6 and described below. Master B 306 then checks for errors (508) and then whether there are more slave accesses to be made (510). If there are no more transactions with the slave device 308, Master B 306 returns ADDR2 to logic 1 (512) and the method ends (514).

If there is an error after accessing the slave device 308, Master B 306 discontinues accessing the slave device 308, returns ADDR2 to logic 1 (512) and the method ends (514). If there are additional slave accesses to be performed after the initial access (506) and error check (508), then Master B 306 again accesses the slave device 308 via Address2 using the standard I²C protocol (506) and flow continues from there.

If Master A 304 is accessing the slave device 308 (as indicated by ADDR1 being at logic 0) when Master B 306 checks ADDR1 (502), then Master B 306 backs off for a delay period (516) and then checks if a maximum retry limit has been exceeded (518). If the maximum retry limit has not been exceeded, Master B 306 checks ADDR1 again (502) and flow continues from there. If the maximum retry limit has been exceeded, the method ends (514).

FIG. 6 depicts a flowchart that illustrates the modified standard I²C bus arbitration protocol called for at (406) and (506) in the above described methods 400, 500 of FIGS. 4 and 5 respectively. Note that the method 600 of FIG. 6 is similar to the prior art method 200 of FIG. 2 but with a back off delay and a retry counter and limit. When either master 304, 306 is ready to access the slave device 308, the master (e.g., Master A 304 or Master B 306) issues a START command (602) and then determines if the master is the current bus master (604). If so, the bus master selects the desired slave device 308 using the address indicated in the calling method 400,500 for the slave device 308 (606). If the master does become the current bus master and selects a slave device 308, a check is next performed to determine of the slave device 308 has been correctly selected (608) and if there is no error, a single transaction (e.g., read, write, or combined) with the selected slave is performed (610). However, if a slave selection error does occur, the transaction is not performed. In either case, a STOP command is issued (612) and the process 600 ends (614).

If the master does not become the current bus master at (604), then the master backs off for a delay period (616) and then checks if a maximum bus master retry limit has been exceeded (618). If the maximum bus master retry limit has not been exceeded, the master issues a new START command (602), again checks to see if the master has become bus master (604), and flow continues from there. If the maximum bus master retry limit has been exceeded, the method ends (614).

The foregoing description discloses only example embodiments of the invention. Modifications of the above-disclosed apparatus, systems and methods which fall within the scope of the invention will be readily apparent to those of ordinary skill in the art. Accordingly, while the present invention has been disclosed in connection with example embodiments, it should be understood that other embodiments may fall within the scope of the invention, as defined by the following claims.

The invention claimed is:

1. An apparatus comprising:
   a multi-master serial computer bus;
   a first master coupled directly to the bus;
   a second master coupled directly to the bus;
   a slave device coupled to the bus;
   a first I/O line from the first master connected directly to the second master and connected directly to the slave device, wherein the first I/O line is external to the bus; and
   a second I/O line from the second master connected directly to the first master and connected directly to the slave device, wherein the second I/O line is external to the bus;
   wherein a bus arbitration protocol for arbitrating use of the bus restricts the masters to a limited number of transactions each time either master becomes a bus master, and
   wherein the masters are each adapted to use the I/O lines to signal to each other to not become a bus master.

2. The apparatus of claim 1 wherein the first master will not attempt to use the bus if the second master indicates it intends to access the slave device, and the second master will not attempt to use the bus if the first master indicates it intends to access the slave device.

3. The apparatus of claim 1 wherein each master is adapted to assert a signal on its respective I/O line and to become bus master a consecutive plurality of times without another master intervening and becoming bus master.

4. The apparatus of claim 1 wherein the masters are microcontrollers and the slave device is a memory device.

5. The apparatus of claim 1 wherein the first master is adapted to signal to the second master not to become a bus master and the first master is further adapted to perform an uninterrupted read-modify-write transaction with the slave device.

6. The apparatus of claim 1 wherein the multi-master serial computer bus is an Inter-Integrated Circuit ($I^2C$) bus.

7. The apparatus of claim 1 wherein the I/O lines coupled to the slave device are adapted to indicate to the slave device which master is accessing the slave device.

8. A system comprising:
   a multi-master serial computer bus;
   a plurality of masters each coupled directly to the bus;
   a plurality of slave devices coupled to the bus; and
   a plurality of I/O lines wherein a respective I/O line extends from each of the plurality of masters and is connected directly to all others of the plurality of masters and is connected directly to each of the slave devices, wherein the plurality of I/O lines is external to the bus;
   wherein a bus arbitration protocol for arbitrating use of the bus restricts the masters to a limited number of transactions each time any master becomes a bus master, and
   wherein the masters are each adapted to use the I/O lines to signal to one another not to become a bus master.

9. The system of claim 8 wherein a master will not attempt to use the bus if any other master indicates it intends to access the slave device.

10. The system of claim 8 wherein each master is adapted to assert a signal on its respective I/O line and to become bus master a consecutive plurality of times without another master intervening and becoming bus master.

11. The system of claim 8 wherein the masters include microcontrollers and the slave devices include at least one memory device.

12. The system of claim 8 wherein each master is adapted to signal all other masters not to become a bus master and at least one master is further adapted to perform an uninterrupted read-modify-write transaction with a slave device.

13. The system of claim 8 wherein the multi-master serial computer bus is an Inter-Integrated Circuit ($I^2C$) bus.

14. The system of claim 8 wherein the I/O lines coupled to the slave devices are adapted to indicate to the slave devices which master is accessing the slave devices.

15. A method comprising:
   providing a multi-master serial computer bus coupling a first master, a second master and a slave device and having a bus arbitration protocol for arbitrating use of the bus, wherein the bus arbitration protocol restricts each of the masters to a limited number of transactions with the slave device when either master becomes a bus master;
   providing a first I/O line from the first master extending directly to the second master and directly to the slave device, wherein the first I/O line is external to the bus;
   providing a second I/O line from the second master extending directly to the first master and directly to the slave device, wherein the second I/O line is external to the bus;
   signaling the second master to not become a bus master using the first I/O line when the first master intends to perform a sequence of consecutive, uninterrupted transactions with the slave device without the second master intervening; and
   signaling the first master to not become a bus master using the second I/O line when the second master intends to perform a sequence of consecutive, uninterrupted transactions with the slave device without the first master intervening.

16. The method of claim 15 wherein the first master will not attempt to use the bus if the second master indicates it intends to access the slave device, and the second master will not attempt to use the bus if the first master indicates it intends to access the slave device.

17. The method of claim 15 further including asserting a signal on each master's respective I/O line to indicate it intends to access the slave device.

18. The method of claim 15 further including:
   signaling from the first master to the second master not to become a bus master; and
   performing, by the first master, an uninterrupted read-modify-write transaction with the slave device.

19. The method of claim 15 wherein providing the multi-master serial computer bus includes providing an Inter-Integrated Circuit ($I^2C$) bus.

20. The method of claim 15 further including indicating to the slave device which master is accessing the slave device via the I/O lines being coupled to the slave device.

* * * * *